United States Patent [19]

Selivanov et al.

[11] 3,911,725

[45] Oct. 14, 1975

[54] METHOD OF OPERATING LIFE TESTING HYDRAULIC UNITS WITH LINEAR-MOTION OUTPUT MEMBER

[76] Inventors: Mikhail Prokhorovich Selivanov, Leningradskoe shosse, 49-51, korpus 1, kv. 38; Vladimir Genrikhovich Neiman, Petrozavodskaya ulitsa, 15, korpus 1, kv. 103; Jury Viktorovich Tochilin, 3 Vladimirovskaya ulitsa, 20, kv. 15; Boris Vitalievich Shamro, ulitsa Osipenko, 15/16, kv. 7; Valentin Ivanovich Panin, Volgogradsky prospekt, 158, korpus 1, kv. 23, all of Moscow, U.S.S.R.

[22] Filed: Aug. 28, 1974

[21] Appl. No.: 501,287

[52] U.S. Cl. ............... 73/15.4; 73/37; 73/168; 73/432
[51] Int. Cl.² ............... G01M 13/00; G01M 19/00
[58] Field of Search ........... 73/432 R, 168, 37, 15.4, 73/15.6

[56] References Cited
UNITED STATES PATENTS

| 2,971,870 | 2/1961 | Conti et al. | 73/15.6 |
| 3,099,163 | 7/1963 | Raymond | 73/168 |

*Primary Examiner*—S. Clement Swisher
*Attorney, Agent, or Firm*—Waters, Schwartz & Nissen

[57] ABSTRACT

The invention relates to methods of operating life testing hydraulic units with linear-motion output member. The method consists in the following: Delivery pressure and temperature maximum admissible for the unit being tested are established. A control pulse is fed to the unit so as to impart to the output member thereof a cyclical reciprocatory motion whose amplitude and frequency are constant during the tests and correspond to maximum available speed of the unit being tested. An external load is applied to the output member, the external load being preliminarily determined in accordance with the invention on the basis of the equivalent accumulation of the fatigue damages of load-bearing members of the unit being tested. The unit is caused to operate with a number of cycles of the reciprocations of the output member of the unit being tested for a testing time which is preliminarily determined in accordance with the invention on the basis of the equivalent wear of the unit seals. Subsequently, the ageing of the unit is performed under non-operating conditions at maximum admissible temperature and for a time which is preliminarily determined on the basis of the equivalent ageing of the unit seals. The method according to the invention permits to reduce the duration of the operating life tests of hydraulic units by about 3–5 times and to considerably reduce the cost of such tests.

6 Claims, No Drawings

METHOD OF OPERATING LIFE TESTING HYDRAULIC UNITS WITH LINEAR-MOTION OUTPUT MEMBER

The invention relates to the operating life tests of units, and more particularly to methods of operating life testing hydraulic units with linear-motion output member.

The present invention may be the most advantageously used for operating life tests of electrohydraulic and hydromechanic units of control systems to be used in vehicles, and especially in aircraft.

Known in the art is a method of operating life testing such units under conditions close to the operating (normal) conditions comprising establishing constant delivery pressure and temperatuure of working liquid with subsequent imparting to the output member of the unit being tested of a cyclical reciprocatory motion at a constant amplitude and frequency under an alternating external load and with a predetermined number of reciprocation cycles of the output member and a preset testing time.

This method of normal operation life testing hydraulic units is deficient in its long duration and high cost, as well as in the fact that a large number of expensive test benches are required.

These disadvantages are especially pronounced due to a rapid increase of the specified operating life of these units and a reduction of the terms of development of new units and organization of their serial production.

Also known in the art are methods of operating life testing hydraulic units comprising increasing the delivery pressure by 10% against the maxiimum design pressure, or increasing the rate of passing the operating cycles up to the value at which the power cylinder movable seals are not yet overheated.

These methods of accelerated operating life testing are deficient in their limited scope due to the fact that the tests are conducted with an increase in only one parameter resulting in accelerated accumulation of non-reversible changes in only one, the "weakest" (critical) structural member of the unit, as well as due to the fact that the operating life of the units tested for normal conditions cannot be determined on the basis of the results of the accelerated operating life tests.

These methods of accelerated testing provide only for comparative assessment of operating life values for several embodiments of one and the same unit with one different critical member, and also for testing the efficiency of improvement of certain critical elements thereof.

It is an object of the invention to provide a method of operating life testing hydraulic units with linear-motion output member which provides for substantial reduction of the test time for units having a long specified operating life, whereby the serial manufacturing of new units can be introduced wiithin a shorter time period.

Further object of the invention is to provide for regular quality check of the units at the right time during the check inspection of serially produced units.

These and other objects are accomplished by the provision of a method of operating life testing hydraulic units with linear-motion output member comprising establishing a constant delivery pressure of working liquid supplied to the unit being tested, as well as the temperature thereof during the test, with subsequent feeding of a control pulse imparting a cyclical reciprocatory motion to the output member of the unit at a constant amplitude and frequency under an alternating external load and with a predetermined number of cycles during a preset testing time, wherein according to the invention, the method comprises the steps of maintaining the delivery pressure of the working liquid and the temperature thereof substantially equal to the respective maximum values admissible for the unit being tested, and establishing the amplitude and frequency of the reciprocatory motion of the output member thereof so as to correspond to the maximum available velocity of this member, the number of cycles of its reciprocations and the time of testing this unit being preliminarily determined on the basis of the equivalent wear of its seals, while the magnitude of the external load being determined on the basis of the equivalent accumulation of the fatigue damages in load-bearing members of the unit being tested, with subsequent ageing of the unit under non-operating conditions at maximum admissible temperature and during the ageing time which is determined on the basis of the equivalent ageing of seals of the unit being tested.

This method of testing ensures substantial acceleration of the tests of hydraulic units due to the fact that the performance of such tests under an elevated delivery pressure of working liquid and at an elevated temperature thereof, as well as at an elevated velocity of the output member results in an increased rate of accumulation of non-reversible changes in critical structural members of the units.

On the basis of the engineering and statistical analysis we have found that critical members of the hydraulic units being tested include rubber (or PTFE) seals of the movable joints of the output members of these units and their load-bearing elements, the wear and ageing being the main non-reversible changes for the seals, and the accumulation of the fatigue damages is the critical factor for load-bearing elements.

According to the invention, the accumulation of average non-reversible changes (wear, ageing and accumulation of the fatigue damage) in all selected critical members of a unit during these tests equivalent to those inherent for normal tests was laid in the basis of determination of the conditions of the operating life tests, that is there is provided the equivalence between normal tests and the accelerated tests according to the invention in respect of the accumulation of non-reversible changes in critical members.

Since the number of cycles of reciprocatory motion of the output member of the unit being tested and the testing time for the unit are preliminarily determined on the basis of the equivalent wear of seals of the unit being tested, the magnitude of the external load is determined on the basis of the equivalent accumulation of the fatigue damages of load-bearing members of the unit being tested, and the ageing of the unit being tested is conducted under non-operating conditions at maximum admissible temperature and during the time determined on the basis of the equivalent ageing of seals of the unit being tested, the state of the critical members of the unit after the accelerated operating life tests will be the same as that after the normal tests, whereby the results of the accelerated tests may be used for assessment of the equivalent operating life for normal operating conditions.

In accordance with one embodiment of the method according to the invention the amplitude of the reciprocatory motion of the output member is maintained constant, while its maximum available velocity is obtained by increasing the frequency of this motion, the number of cycles of the reciprocations and the testing time being determined by the following formulas:

$$n_1 = n_0 \left(\frac{v_0}{v_1}\right)^a \left(\frac{t_0}{t_1}\right)^b \left(\frac{P_0}{P_1}\right)^c, \quad (1);$$

$$\tau_1 = \tau_0 \left(\frac{v_0}{v_1}\right)^{1+a} \left(\frac{t_0}{t_1}\right)^b \left(\frac{P_0}{P_1}\right)^c \quad (2);$$

wherein
- $n$ is number of cycles of the reciprocations of the output member;
- $\tau$ is testing time;
- $v$ is velocity of the output member;
- $t$ is temperature of working liquid;
- $P$ is delivery pressure of working liquid;
- 0 and 1 are foot symbols attributing the above-mentioned values to normal tests and to the tests according to the invention, respectively;
- $a$, $b$ and $c$ are coefficients depending on the properties of seals of the unit being tested and on their operating conditions.

This method enables the maximum possible accuracy of simulating the operating conditions of the output member seals during the accelerated tests.

Furthermore, this contributes to substantial acceleration of the operating life tests of hydraulic units to be operated at relatively low temperatures ($t_o$ 60°C) and having high fatigue resistance, where the service life is limited by the seal wear.

The magnitude of the external load is preferably determined by the following formula:

$$\sigma_1 = \sigma_0 \left(\frac{n_0}{n_1}\right)^{1/m} \quad (3);$$

wherein
- $\sigma$ is magnitude of the external load;
- $m$ is power for the fatigue curve of load-bearing members of the unit being tested, the other symbols having the above-mentioned significance.

This embodiment of the method enables the acceleration of the operating life tests of low-temperature units whose service life is limited by the seal wear and by the fatigue of load-bearing members.

The ageing time for the unit being tested under non-operating conditions in all cases may be determined by the following formula:

$$\Delta \tau_1 = \tau_0 (k)^{-0.1(t_1 - t_0)} - \tau_1 \quad (4);$$

wherein
- $\Delta \tau_1$ is ageing time of the unit being tested;
- $k$ is coefficient characterizing a change in the rate of ageing of the seal material with a change in the temperature by 10°C., the other symbols having the above-mentioned significance.

This embodiment of the method enables the efficient acceleration of the tests of high-temperature units ($t_o > 60$°C).

In some operating life tests the number of the reciprocations of the output member, the magnitude of the external load upon this member and the delivery pressure of the working liquid are preferably to be unchanged, while the frequency and amplitude of the reciprocatory motion of the output member, as well as the testing time should be determined on the basis of the equivalent wear and ageing of seals of the unit being tested by the following formulas:

$$f_1 = f_0 (k)^{0.1(t_1 - t_0)} \quad (5);$$

$$A_1^{1+a} = A_0^{1+a} (k)^{-0.1a(t_1 - t_0)} \left(\frac{t_0}{t_1}\right)^b \quad (6);$$

$$\tau_1 = \tau_0 (k)^{-0.1(t_1 - t_0)} \quad (7);$$

This embodiment of the method ensures high accuracy of the accelerated tests results for high-temperature units whose service life largely depends on the fatigue of load-bearing members of the unit, and especially so in multichannel units, since in this case the delivery pressure of the working liquid, the magnitude of the load upon the output member and the number of loading cycles remain unchanged.

In another embodiment of the method according to the invention the requirement of the equivalent accumulation of the fatigue damages is complied with by establishing the frequency of the ouput member reciprocations at 3–5 c/s, the amplitude of its motion corresponding to the maximum available velocity thereof, and the magnitude of the external load equal to 80–90% of the maximum force developed by the unit being tested, the number of cycles of the reciprocatory motion of the output member being determined by the formula:

$$n_1 = n_0 (\sigma_0/\sigma_1)^m \quad (8)$$

This embodiment of the method enables maximum acceleration of the operating life tests for those units whose service life depends only on the fatigue of load-bearing members.

In addition to the above-said, the invention makes it possible to reduce the number of expensive test benches and productive areas required for their accommodation.

The invention will now be described in details as applied to the method of accelerated operating life testing hydromechanical units to be used in control systems of aircraft.

The following parameters of normal tests of the unit being tested, which are obtained as a result of the analysis of the operating conditions thereof, are laid in the basis of the method of accelerated operating life testing according to the invention:
- delivery pressure $P_0$ of working liquid which is admitted to be constant during the tests;
- temperature $t_0$ of working liquid which is admitted to be constant during the tests;
- amplitude $A_0$ of the reciprocatory (sinusoidal) motion of the output member of the unit being tested (piston rod of the power cylinder thereof);
- frequency $f_0$ of the sinusoidal motion of this output member;
- symmetrical alternating external load upon this member with magnitude $\sigma_0$;
- number of cycles $n_0$ of the reciprocatory motion of the output member;
- time $\tau_0$ of the tests of the unit.

In addition, the basic data for determination of the operating life test program according to the invention include the following parameters of the unit being tested and of a hydraulic system in which this unit operates:

— maximum available velocity $v_1$ of the output member of the unit;

— maximum developed force $\sigma_m$ on the output member of the unit;

— maximum admissible temperature $t_1$ of working liquid which is limited by the ultimate temperature of working liquid, as well as for elements and materials used in the unit being tested (the contact temperature of the movable seals of the power cylinder being taken into account);

— maximum admissible delivery pressure $P_1$ of working liquid supplied to the unit being tested which is limited by the threshold pressure of the hydraulic system security valve;

— coefficients $a$, $b$, $c$ and $k$ depending on the seals used in the unit being tested and on operating conditions thereof;

— coefficient $m$ depending on the material of the load-bearing members of the unit being tested (piston rod, shackle, housing of the power cylinder, etc.).

Prior to the conduct of the accelerated tests according to the invention, the conditions of these tests are determined in the followig order.

Maximum velocity $v_0$ of the output member under normal operating conditions is determined on the basis of the amplitude $A_0$ and frequency $f_0$ of this motion.

Then, in accordance with the invention, on the basis of the equivalent wear of seals of the movable joints of the output member the number of cycles $n_1$ of its reciprocations is determined by the following formula:

$$n_1 = n_0 \left(\frac{v_0}{v_1}\right)^a \left(\frac{t_0}{t_1}\right)^b \left(\frac{P_0}{P_1}\right)^c , \quad (1);$$

and the time $\tau_1$ of accelerated tests by the following formula:

$$\tau_1 = \tau_0 \left(\frac{v_0}{v_1}\right)^{1+a} \left(\frac{t_0}{t_1}\right)^b \left(\frac{P_0}{P_1}\right)^c \quad (2);$$

Accordingly, while maintaining the amplitude $A_0$ of the reciprocations of the output member unchanged, the frequency $f_1$ is determined by the formula:

$$f_1 = f_0 \left(\frac{v_1}{v_0}\right).$$

Then, according to the invention, on the basis of the equivalent accumulation of the fatigue damages in load-bearing members, the magnitude $\sigma_1$ of the external load upon the output member is determined by the following formula:

$$\sigma_1 = \sigma_0 \left(\frac{n_0}{n_1}\right)^{1/m} \quad (3)$$

After that, in accordance with the invention, on the basis of the equivalent ageing of the seals of the unit being tested, the ageing time thereof $\Delta \tau_1$ under non-operating conditions is determined by the following formula:

$$\Delta \tau_1 = \tau_0 (k)^{-0.1(t_1 - t_0)} - \tau_1 \quad (4);$$

If the result of calculation by the formula (4) will be the negative value of $\Delta \tau_1$, this indicates to "overageing" of the unit seals during the tests for the time $\tau_1$ at the temperature $t_1$. In order to to prevent such overageing of the seals, the temperature $t_1$ should be reduced to the value $t_1'$ at which the condition $\Delta \tau_1 = 0$ is fulfilled. Therefore, $\tau_1$ and $n_1$ are determined by the formulas (2) and (1), respectively, by replacing $t_1$ with $t_1'$. In this case there is no need to conduct the ageing operation for the unit under non-operating conditions.

After determination of the conditions of the operating life tests, these tests are conducted in the following order.

The unit to be tested is placed on a test bench which ensures the provision of the conditions required for accelerated tests with the parameters $P_1$, $t_1$, $A_1$, $f_1$, $\tau_1$.

Working liquid is supplied to the input socket pipe of the unit being tested with the delivery pressure $P_1$ and at the temperature $t_1$ which are constant during the tests according to the invention.

Then an external load with the magnitude $\sigma_1$ at the reciprocations of the output member $A_1 = A_0$ is applied to the output member of the unit being tested.

Then a control pulse is fed to the output member of the unit being tested from an electromechanical or hydromechanical sinus-setter so as to impart to the output member of the unit a sinusoidal motion with the amplitude $A_1 = A_0$ and with the frequency $f_1$.

Subsequently, the unit is caused to operate with the number of cycles $n_1$ of reciprocations of the output member of the unit being tested, which was preliminarily determined by the formulas (1) and (2), during the testing time $\tau_1$.

Then, in accordance with the invention, the ageing of the unit is conducted under non-operating conditions at the temperature $t_1$ during the time $\Delta \tau_1$, which was preliminarily determined by the formula (4).

For that purpose the unit being tested is disconnected from hydraulic liquid supply and is placed in a conventional thermal cabinet or any other apparatus which provides for maintenance of the ambient temperature $t_1$ for the time $\Delta \tau_1$.

In order to improve the accuracy of the test results for units having a long specified operating life (with $\tau_0$ more than 1000 hours), the accelerated tests are preferably conducted in two consequent stages with operation with $n_1/2$ cycles of the reciprocations of the output member of the unit for the time $\tau_1/2$ at each stage, with subsequent ageing for the time $\Delta \tau_1/2$.

After the accelerated operating life tests conducted in the above-described order have been completed, the required checks of the unit being tested are made, and the results of the accelerated operating life tests are evaluated.

For high-temperature hydraulic units whose service life largely depends on the fatigue of their load-bearing members (especially for multichannel units) the values $f_1$, $A_1$ and $\tau_1$ are determined on the basis of the equivalent the wear and ageing of seals of the unit being tested by the following formulas:

$$f_1 = f_0 (k)^{0.1(t_1 - t_0)} \quad (5);$$

$$A_1{}^{1+a} = A_0{}^{1+a} (k)^{-0.1a(t_1 - t_0)} \left(\frac{t_0}{t_1}\right)^b \quad (6);$$

$$\tau_1 = \tau_0 (k)^{-0.1(t_1 - t_0)} \quad (7);$$

with $P_1 = P_0$, $\sigma_1 = \sigma_0$ and $n_1 = n_0$.

In this embodiment of the method of operating life testing the ageing of the unit under non-operating conditions is not conducted.

For units whose service life is determined only by the fatigue of their load-bearing members the frequency $f_1$ of the reciprocations of the output member is admitted to be equal to 3–5 c/s, and the magnitude $A_1 = 80$–$90\%$ $\sigma_m$ of the external load is determined on the basis of the achievement of the velocity $v_1$ of the output member. Then, on the basis of the equivalent accumulation of the fatigue damages the number of cycles $n_1$ of the reciprocations of the output member is determined by the formula:

$$n_1 = n_0 (\sigma_0/\sigma_1)^m \quad (8)$$

With this embodiment of the method of operating life testing the ageing of the units under non-operating conditions is not conducted.

In testing hydraulic units with electromagnetic valves, which remain energized for a long time during the tests, an additional heating may occur resulting in an additional ageing of rubber seals of the valves so that the danger of unsealing of the unit at these seals arises.

In order to ensure the equivalent ageing of the rubber seals of such valves, in addition to an increase in the temperature of the working liquid, the supply voltage of the control windings of these valves should also be increased in conducting the accelerated tests.

As an example given herebelow is a Table showing comparative data for conditions of normal operating life tests and accelerated operating life tests according to the invention conducted for a standard steering drive of the flight control system of a light-weight helicopter.

The accelerated operating life tests by the method according to the invention can be conducted practically on the same equipment and in the same order as normal operating life tests so that the introduction of the method according to the invention in practice requires no changes in the existing test procedures.

And finally, the use of the method according to the invention enables the reduction of the number of expensive test benches and productive areas required for their accommodation.

What is claimed is:

1. A method of operating life testing hydraulic units with linear-motion output member comprising the steps of establishing the delivery pressure and temperature of working liquid maximum admissible for the unit being tested; feeding to said unit being tested of a control pulse imparting to the output member of said unit a cyclical reciprocatory motion with the amplitude and frequency which are constant during said tests and correspond to maximum available velocity of said unit being tested; applying an external load to the output member of said unit which is determined on the basis of the equivalent accumulation of the fatigue damages in load-bearing members of said unit; operating with a number of cycles of said reciprocations of the output member for a testing time, the number of cycles and the testing time being determined on the basis of the equivalent wear of seals of said unit; with subsequent ageing of said unit under non-operating conditions for a time which is determined on the basis of the equivalent ageing of seals of said unit being tested.

2. A method as claimed in claim 1, wherein the amplitude of the reciprocations of the output member of the unit being tested is maintained unchanged, while its maximum available velocity is obtained by increasing the frequency of said reciprocations, the number of cycles of said reciprocations and the testing time being determined by the following formulas:

| Test type | Conditions | P kg/cm² | t °C | A mm | f c/s | kg | n | hours | hours | |
|---|---|---|---|---|---|---|---|---|---|---|
| Normal tests (foot symbol "0") | | 70 | 90 | 10 | 0.33 | 70 | 1780000 | 1500 | — | — |
| Accelerated tests according to the invention (foot symbol "1") | | 80 | 105 | 10 | 1.2 | 75 | 1140000 | 264 | 70 | $\frac{1500}{264+70} = 4.5$ |

The method of operating life testing hydraulic units according to the invention permits to substantially reduce the duration of the tests and to cut down their cost.

In addition, this method enables a material reduction of the terms of the test operation of the units with a long specified operating life, rapid acceptance of the experimental units for serial production and regular quality check of these units at the right time during the serial manufacturing.

The data obtained in practice show that the invention permits to accelerate the operating life tests of hydraulic units by about 3–5 times.

$$n_1 = n_0 \left(\frac{v_0}{v_1}\right)^a \left(\frac{t_0}{t_1}\right)^b \left(\frac{P_0}{P_1}\right)^c ;$$

$$\tau_1 = \tau_0 \left(\frac{v_0}{v_1}\right)^{1+a} \left(\frac{t_0}{t_1}\right)^b \left(\frac{P_0}{P_1}\right)^c ,$$

wherein:

$n$ is number of cycles of said reciprocations of the output member;

$v$ is velocity of the output member;

$t$ is temperature of working liquid;

$P$ is delivery pressure of working liquid;

$\tau$ is testing time;

0 and 1 are foot symbols attributing the above-mentioned values to normal and accelerated tests, respectively;

a, b and c are coefficients depending on the properties of seals of the unit being tested and on their operating conditions.

3. A method as claimed in claim 1, wherein the magnitude of the external load upon the output member of the unit being tested is determined by the following formula:

$$\sigma_1 = \sigma_2 \left(\frac{n_0}{n_1}\right)^{1/m},$$

wherein $\sigma$ is magnitude of the external load;

$n$ is number of cycles of the reciprocations of the output member;

0 and 1 are foot symbols attributing the above-mentioned values to normal and accelerated tests, respectively;

$m$ is power for the fatigue curve of the material of load-bearing members of the unit being tested.

4. A method as claimed in claim 1, wherein the time of ageing of the unit under non-operating conditions is determined by the following formula:

$$\Delta\tau_1 = \tau_0 (k)^{-0.1(t_1 - t_0)} - \tau_1,$$

wherein $\Delta\tau_1$ is ageing time;

$\tau$ is testing time;

$k$ is coefficient characterizing a change in the ageing rate of the seal material with a change in the temperature by 10°C;

$t$ is temperature of working liquid;

0 and 1 are foot symbols attributing the above-mentioned values to normal and accelerated tests, respectively.

5. A method as claimed in claim 1, wherein the number of cycles of the reciprocations of the output member, the magnitude of the external load upon said output member and the delivery pressure of working liquid are maintained unchanged, while the frequency and amplitude of the reciprocations of the output member and the testing time are determined on the basis of the equivalent wear and ageing of seals of the unit being tested by the following formulas:

$$f_1 = f_0 (k)^{0.1(t_1 - t_0)};$$

$$A_1^{1+a} = A_0^{1+a} (k)^{-0.1a(t_1 - t_0)} \left(\frac{t_0}{t_1}\right)^{b};$$

$$\tau_1 = \tau_0 (k)^{-0.1(t_1 - t_0)}.$$

wherein $f$ is frequency of the reciprocations of the output member;

$k$ is coefficient characterizing a change in the ageing rate of the seal material with a change in the temperature by 10°C;

$t$ is temperature of working liquid;

$A$ is amplitude of the reciprocations of the output member;

$\tau$ is testing time;

0 and 1 are foot symbols attributing the above-mentioned values to normal and accelerated tests, respectively;

$a$ and $b$ are coefficients depending on the properties of seals of the unit being tested and on their operating conditions.

6. A method as claimed in claim 1, wherein the equivalent accumulation of the fatigue damages is ensured by establishing the frequency of the reciprocations of the output member equal to 3–5 c/s, the amplitude of its reciprocations corresponding to maximum available velocity thereof, and the magnitude of the external load equal to 80–90% of maximum force developed by the unit being tested, the number of cycles of the reciprocations of the output member being determined by the following formula:

$$n_1 = n_0 \left(\frac{\sigma_0}{\sigma_1}\right)^{m}.$$

wherein $n$ is number of cycles of the reciprocations of the output member of the unit being tested;

$\sigma$ is magnitude of the external load;

$m$ is power for the fatigue curve of the material of load-bearing members of the unit being tested;

0 and 1 are foot symbols attributing the above-mentioned values to normal and accelerated tests, respectively.

* * * * *